(12) United States Patent
Kramer

(10) Patent No.: US 7,203,059 B1
(45) Date of Patent: Apr. 10, 2007

(54) ERGONOMIC PORTABLE COMPUTER

(76) Inventor: Russell G. Kramer, 33 Ranch Rd., E. Falmouth, MA (US) 02536

( * ) Notice: Subject to any disclaimer, the term of this patent is extended or adjusted under 35 U.S.C. 154(b) by 0 days.

(21) Appl. No.: 11/262,865

(22) Filed: Oct. 31, 2005

(51) Int. Cl.
*G06F 1/16* (2006.01)
(52) U.S. Cl. ............... 361/683; 248/165; 210/303; 400/489
(58) Field of Classification Search .. 312/223.1–223.6; 710/303, 304; 400/489, 682, 82; 248/165; 361/679–687, 724–727
See application file for complete search history.

(56) References Cited

U.S. PATENT DOCUMENTS

| | | | |
|---|---|---|---|
| 6,381,128 B1 | 4/2002 | Kramer | |
| 6,816,365 B2* | 11/2004 | Hill et al. | 361/681 |
| 6,912,121 B2* | 6/2005 | Karidis et al. | 361/681 |
| 6,947,279 B2* | 9/2005 | Cheng et al. | 361/683 |
| 6,971,622 B2* | 12/2005 | Ziegler et al. | 248/454 |

* cited by examiner

*Primary Examiner*—Hung Van Duong
(74) *Attorney, Agent, or Firm*—John P. McGonagle

(57) ABSTRACT

A portable computer having a main computer body and a display unit which is slidably attached to the main computer body and movable to various vertical positions up and away from the computer main body.

14 Claims, 16 Drawing Sheets

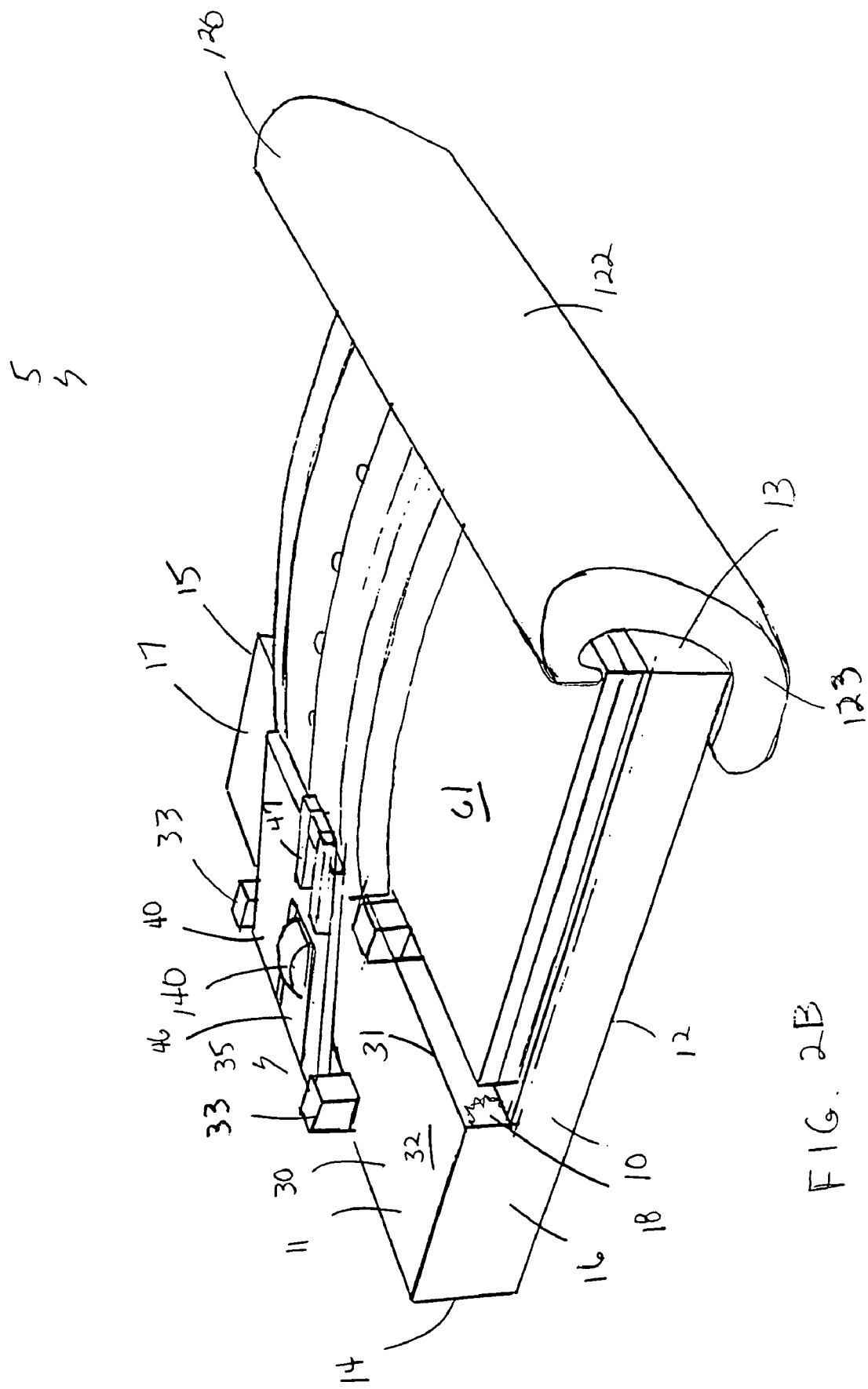

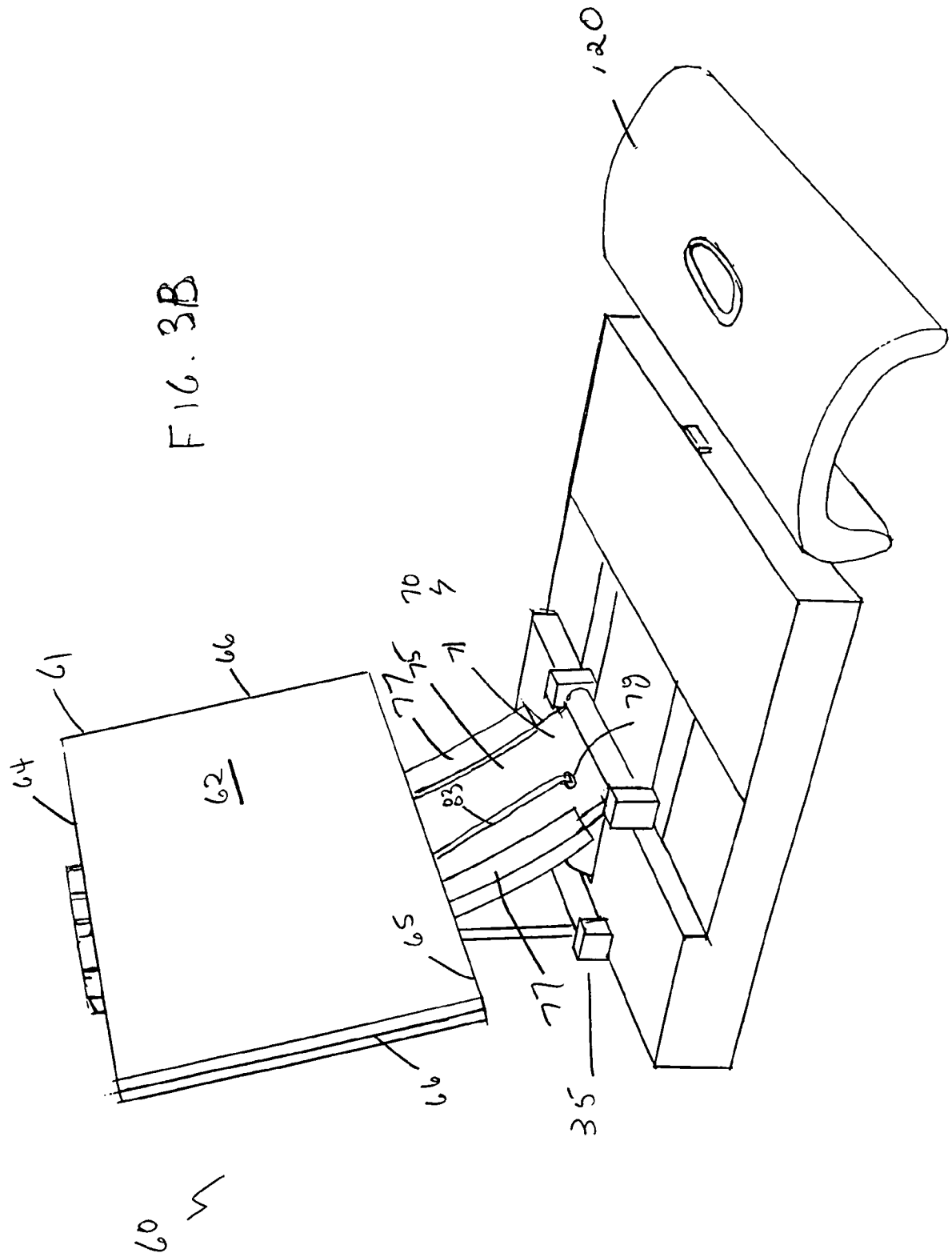

ERGONOMIC PORTABLE COMPUTER

BACKGROUND OF THE INVENTION

This invention relates to portable computers, and in particular, to an ergonomically designed portable computer.

Portable computers, alternatively known as either laptops or notebook computers, were introduced to accommodate the mobile computing needs of people whose work environment is not fixed. Portable computers are light and compact so that they may be easily transported from location to location. Portable computers are continuously being down sized into even smaller and lighter portable computers. Portable computers are characterized by unique design demands. In addition to being durable, portable computers must be of compact construction so that they will be sufficiently small and light weight to be readily carried, held and manipulated for portable use.

According to modern ergonomic theory and experience improper posture of human bodies during the use of computers can produce many types of injuries. These are generally classified as repetitive strain injuries. It is ergonomically desirable to have the keyboard unit approximately at elbow level with the user's arms parallel to the body. The top of the display unit should be approximately at eye level.

Prior art portable computers are not ergonomic. Because of their portability, such computers are frequently used in places that require the user to operate such computers from their lap. In such instances, the user must type with his or her wrists bent at an unnatural angle. Necks and heads must be bent downward to view the screens. This is a particular problem with liquid-crystal displays (LCDs) which are typically more difficult to view at oblique angles. By their very nature portable computers are designed to be used in environments which are not conducive to the best ergonomic setup. As shown in FIG. 1, a standard portable computer has a main computer body 1, a keyboard unit 2 which is electrically and mechanically connected to said main computer body 1, and a display unit 3 which is electrically attached to the main computer body 1 and mechanically attached by some type of hinge mechanism 4. The display unit 3 can be vertically pivoted about said horizontal hinge mechanism 4. When the portable computer is transported or stored, the display unit 3 is folded over the main computer body 1 as a protective cover in a closed position. When in use, the display unit 3 is unfolded and pivoted about the hinge mechanism 4 to an open position. As a practical matter, this construction has limited the angle to which the display can be raised in use of the computer. As a result, the display unit 3 of a standard portable computer cannot be positioned at an optimum angle for use of the computer while actually resting on the lap of a user.

SUMMARY OF THE INVENTION

The present invention addresses the problem of prior art portable computers by providing a portable computer with a display unit which is slidably attached to the main computer body and movable to various vertical positions up and away from the computer main body. In this fashion the wrists and head of the user may use the keyboard and display in a more ergonomically comfortable position.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 2B is a perspective view of the invention in a closed position with cover removed.

FIG. 3B is a perspective view of the invention with display unit partially deployed.

DETAILED DESCRIPTION OF INVENTION

Figure 1:
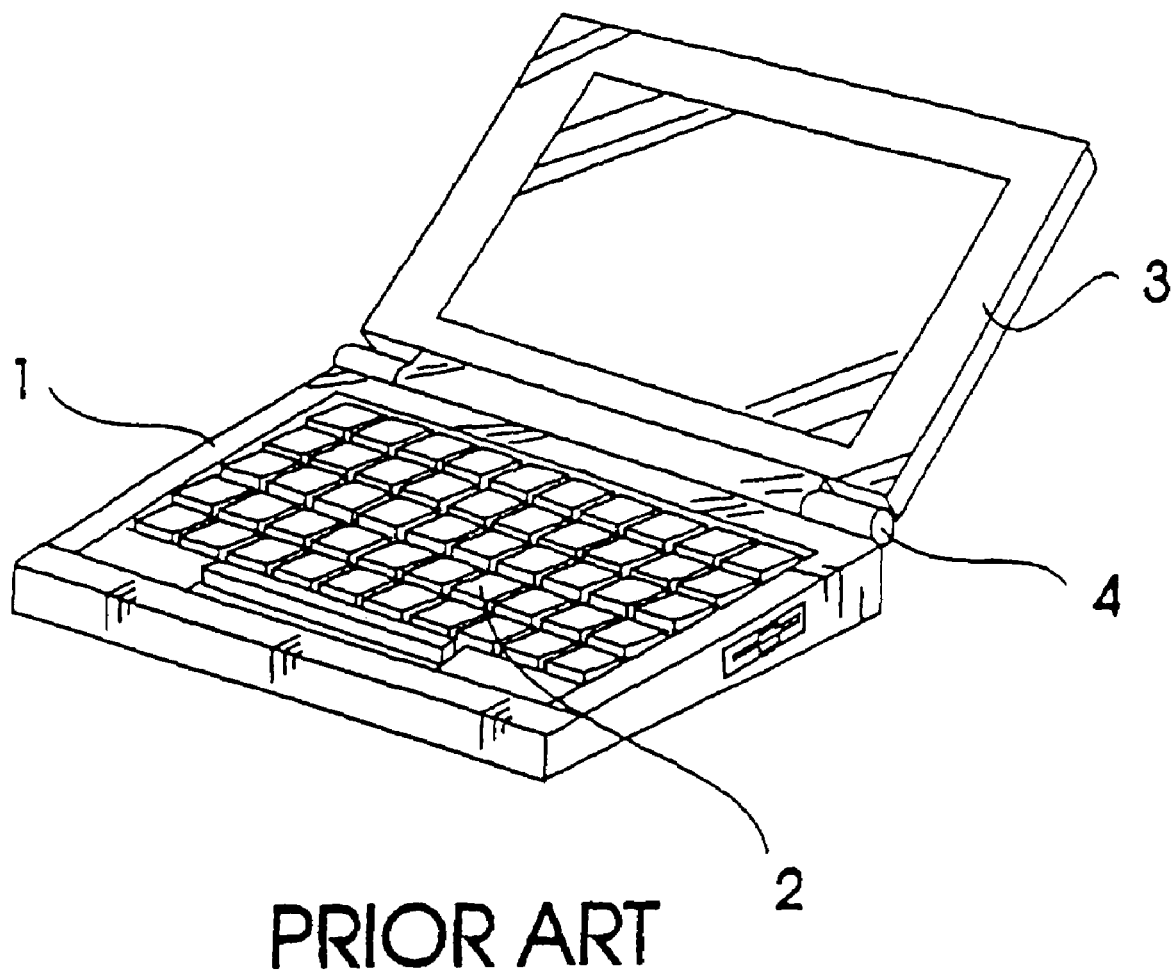
FIG. 1 is a perspective view of a prior art portable computer.

Referring to the drawings in detail wherein like elements are indicated by like numerals, there is shown in FIGS. 2–13 an embodiment of the invention presented as a portable computer 5. The portable computer 5 has a main computer body 10, a keyboard unit 20 which is electrically and mechanically connected to said body 10, a display unit 60 which is attached to the body 10, and a cover 130.

The main computer body 10 has a top 11, bottom 12, front 13, rear 14, right side 15, left side 16, an exterior surface 17 and an interior 18. The computer body front 13 and rear 14 define the computer body length. The computer body right side 15 and left side 16 define the computer body width. The keyboard unit 20 is positioned to the computer body front 13 and the display unit 60 is positioned on top 11 and deployed to the rear 14. The computer body interior 18 contains the conventional computer electronics (not shown) such as CPU, memory, hard drive, driver electronics, bus, diskette and CD-ROM drives, and the like. The cover 130 may be removably positioned over the computer body top 11 and sides 15, 16.

The computer body top 11 has a stepped configuration. The top 11 is divided into a rear shelf portion 30 extending from side 15 to side 16, a middle indented portion 50 also extending from side 15 to side 16, and a combination removable forward shelf/document holder portion 150. In this embodiment of the invention the rear shelf portion foremost edge 31 extends from the body rear 14 forward approximately one-quarter of the computer body length. The middle indented portion 50 begins at the rear shelf portion foremost edge 31 and extends toward the computer body front 13 terminating at the combination forward shelf/document holder portion 150.

Figure 11:
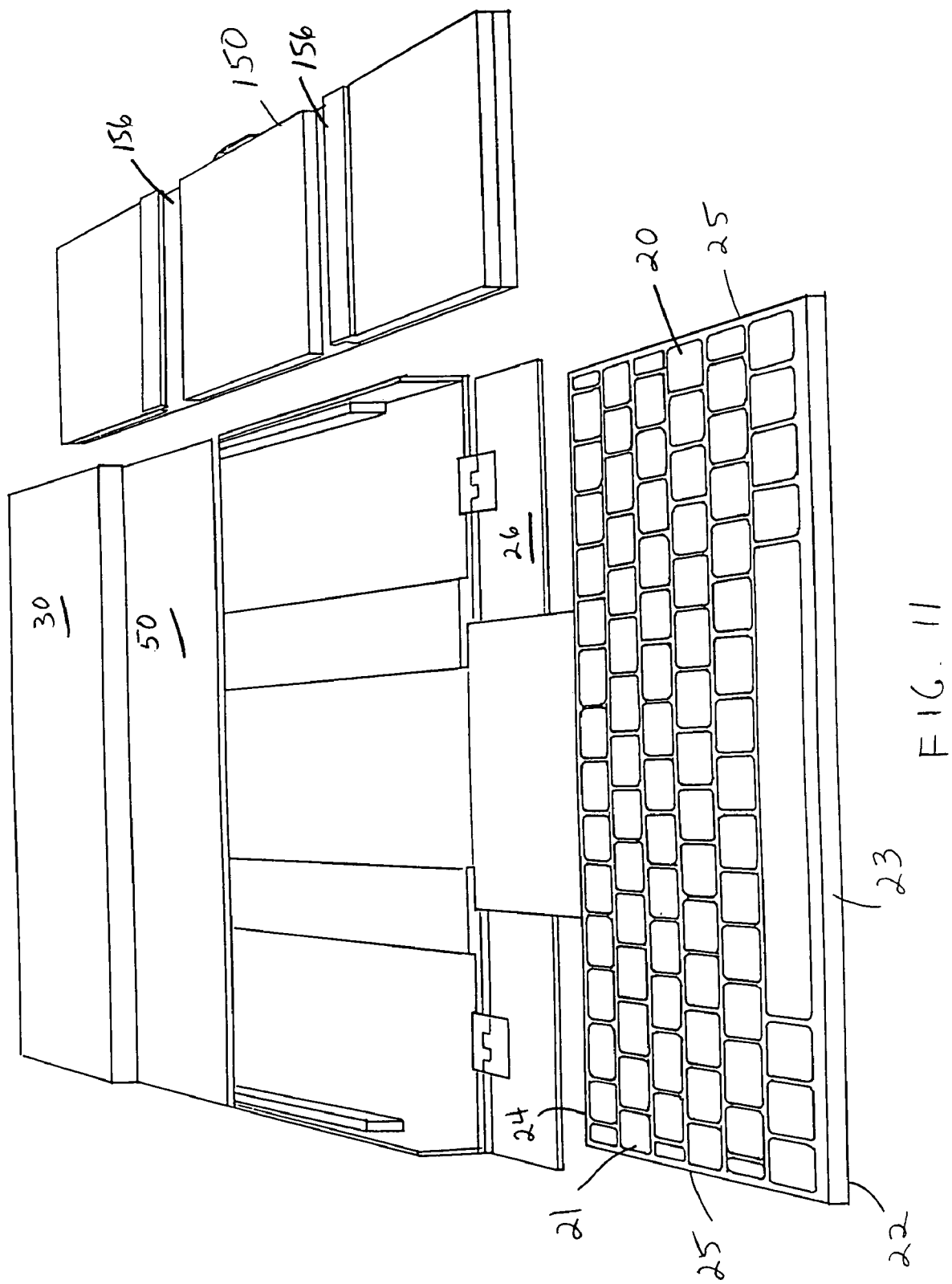
FIG. 11 is the view shown in FIG. 10 with the keyboard unit deployed.
Figure 12:
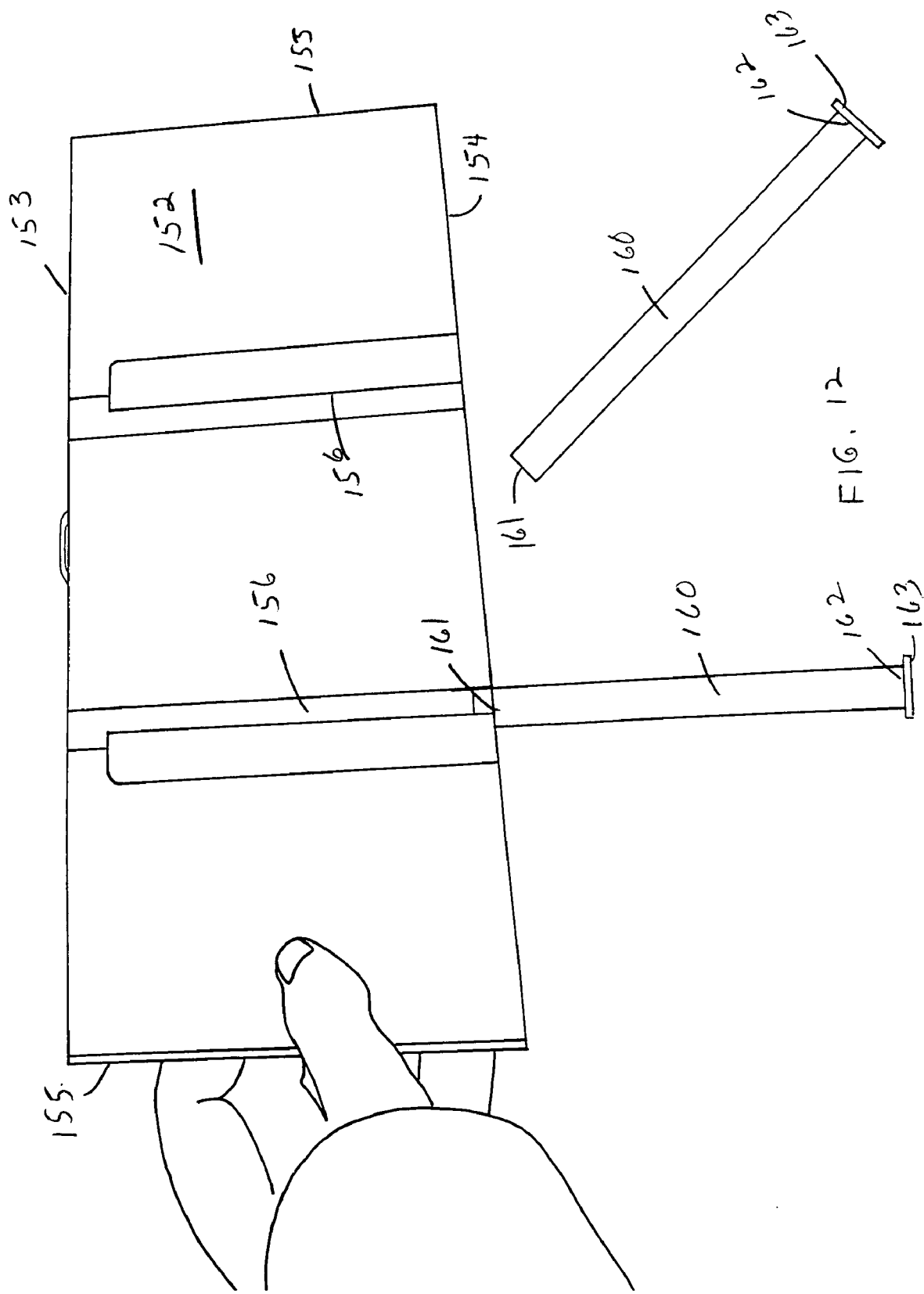
FIG. 12 illustrates the document holder being assembled.
Figure 13:
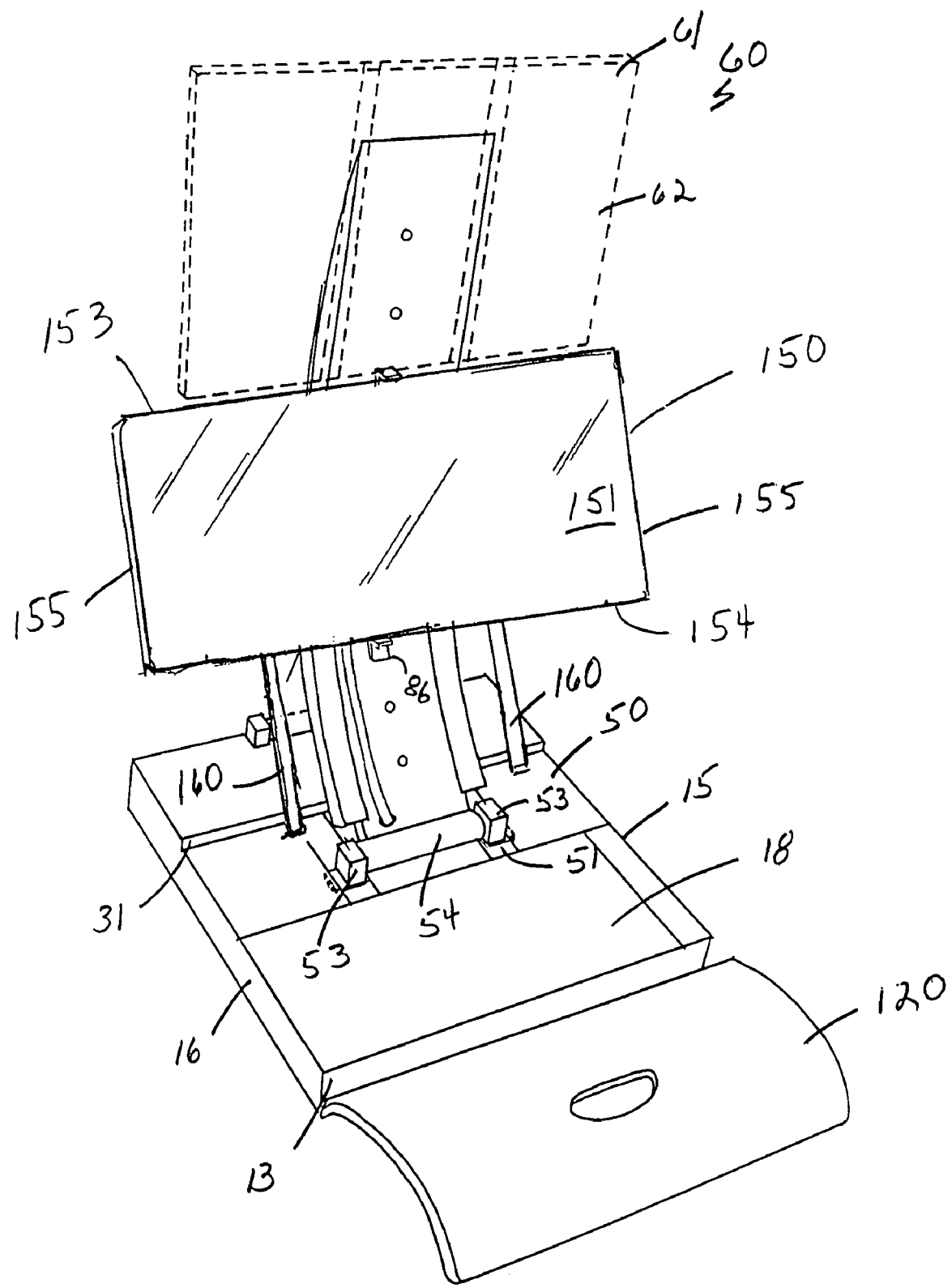
FIG. 13 is the view shown in FIG. 5 with the document holder deployed.

The computer body front 13 has a generally rectangular aperture 19 formed therein, opening into the computer body interior 18. The aperture 19 is secured by a door 26 which is attached by hinges 28 to the computer body bottom 12 along the computer body front 13. A latch 27 is attached to the computer body top 11 at the computer body front 13, said latch 27 being adapted to engage the door 26. The keyboard unit 20 is inserted into said aperture 19. The keyboard unit 20 has a top 21, bottom 22, front 23, rear 24 and two opposite sides 25 interconnecting said front 23, rear 24, top 21 and bottom 22. When the keyboard unit 20 is inserted into the computer body front aperture 19, the keyboard unit front 23 lies in the same general plane as the computer body front 13 and the keyboard unit rear 24 is positioned within the computer body interior 18. The keyboard unit 20 may be accessed by removing the combination forward shelf/document holder 150 from the computer body 10. (See FIG. 10) The keyboard unit 20 may also be pulled forward from the computer body interior 18 as shown in FIG. 11.

Figure 2A:
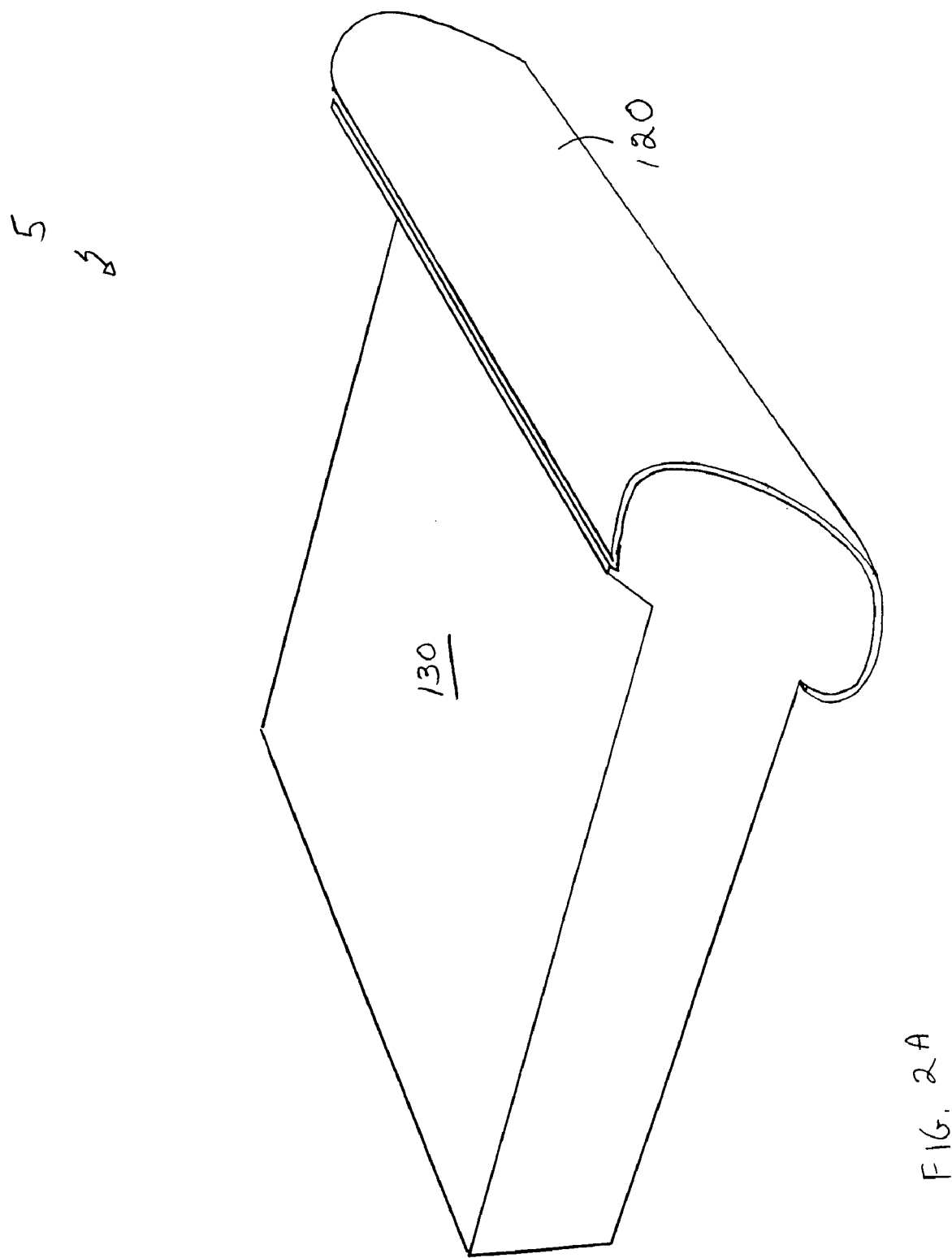
FIG. 2A is a perspective view of the invention.
Figure 2C:
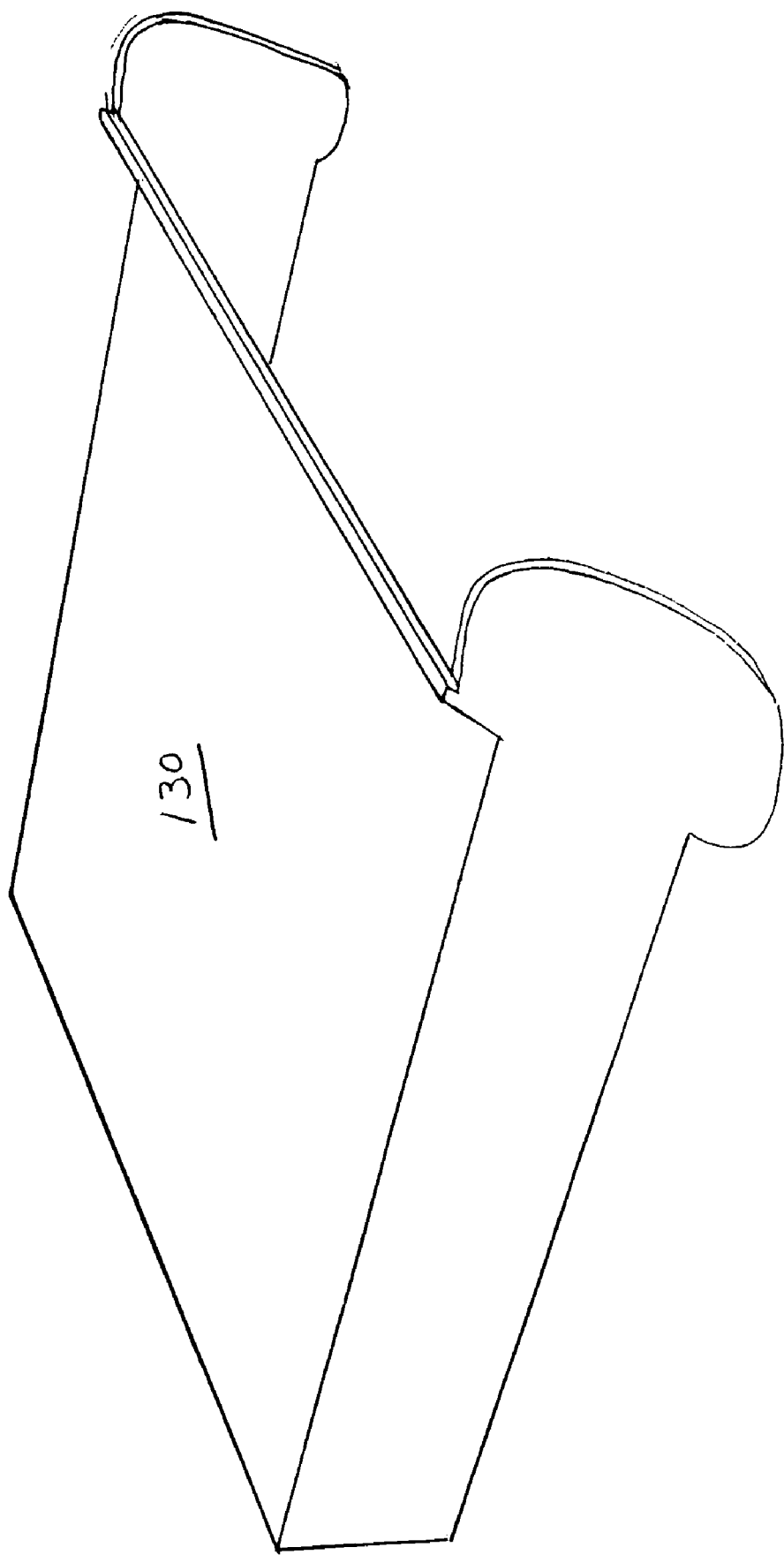
FIG. 2C is a perspective view of the cover of the invention.
Figure 3A:
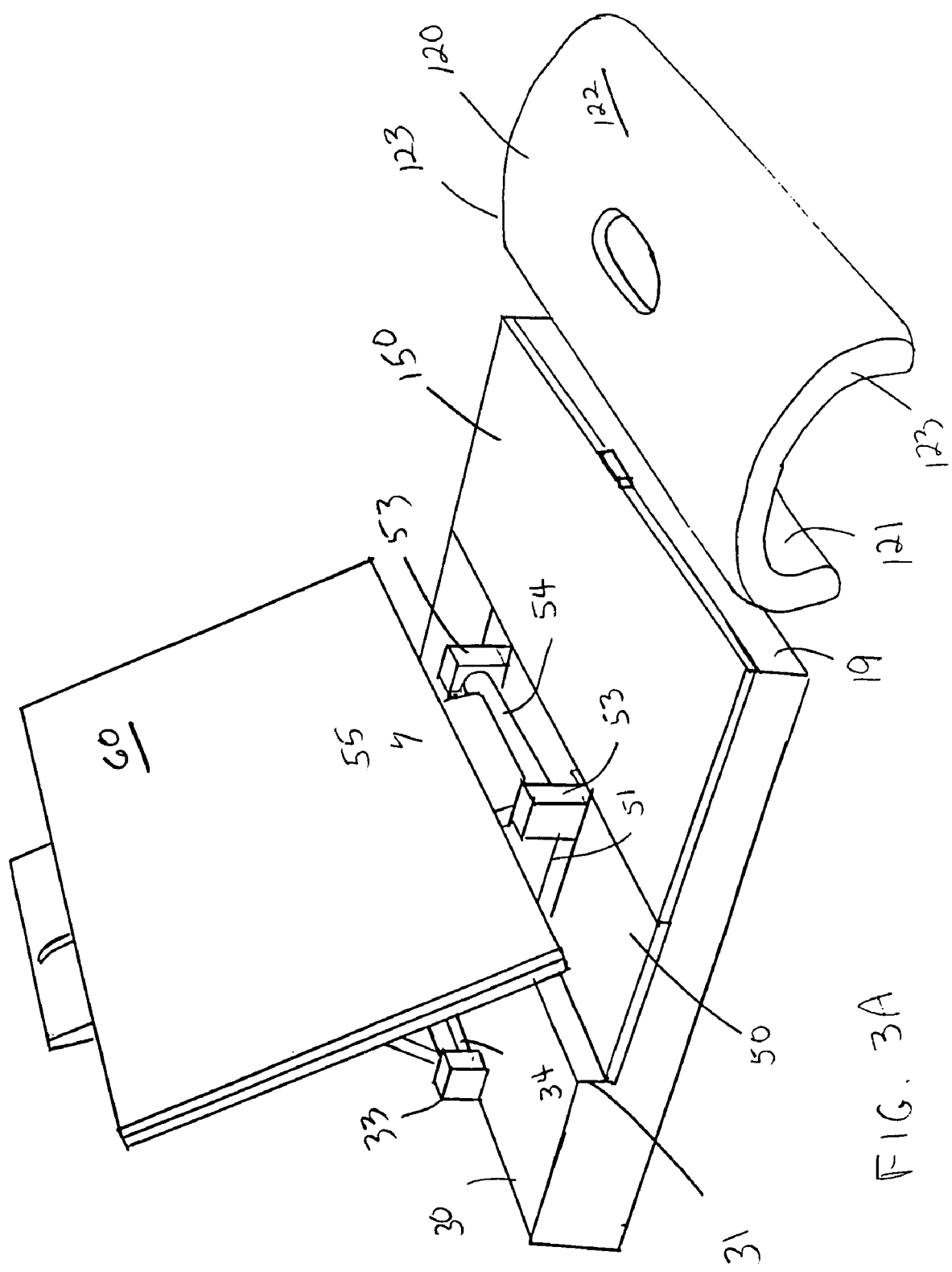
FIG. 3A is a perspective view of the invention with display unit open and arm rest deployed.
Figure 4:
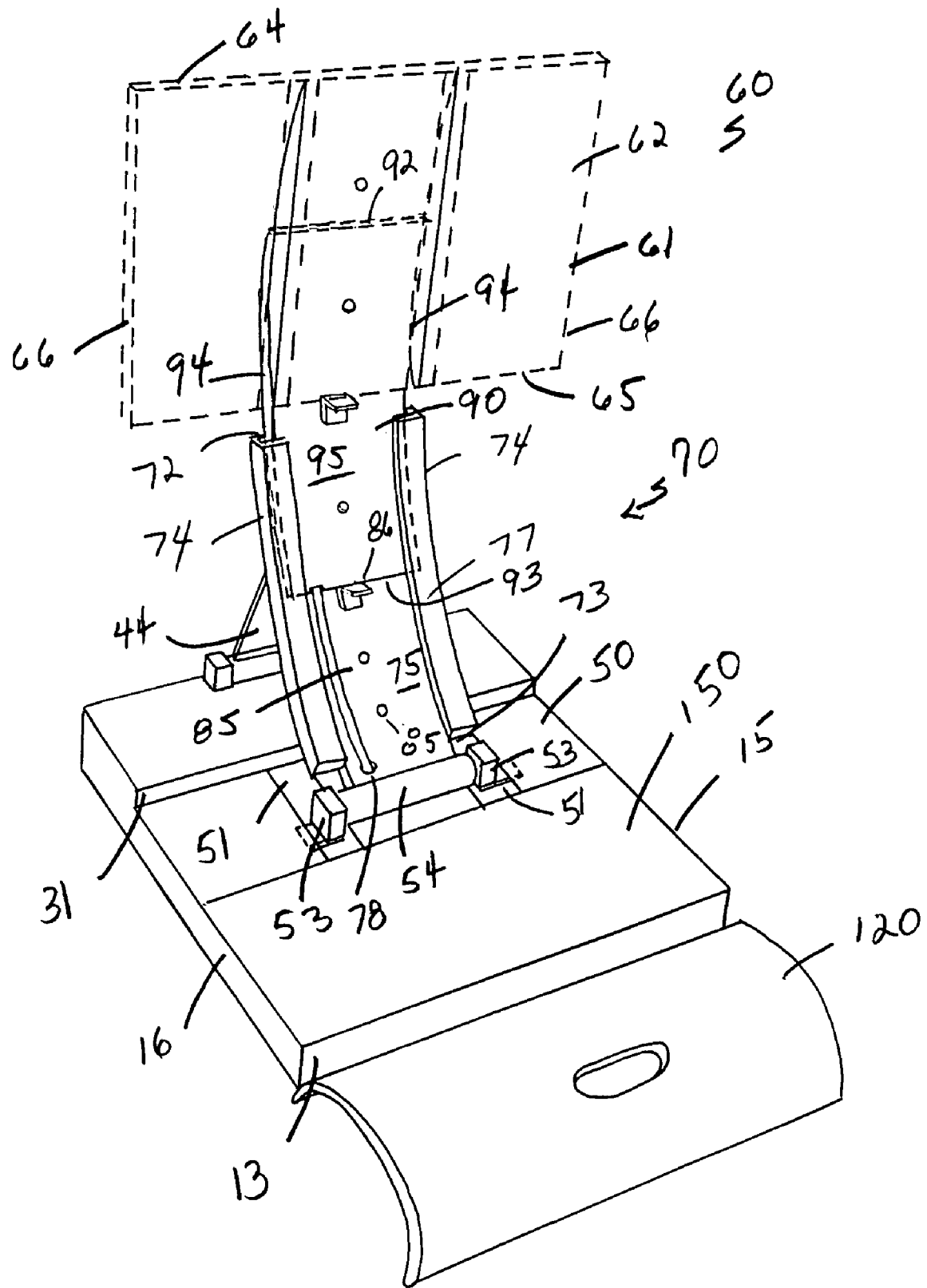
FIG. 4 is a front view of the invention with display unit approximately 75% deployed.
Figure 5:
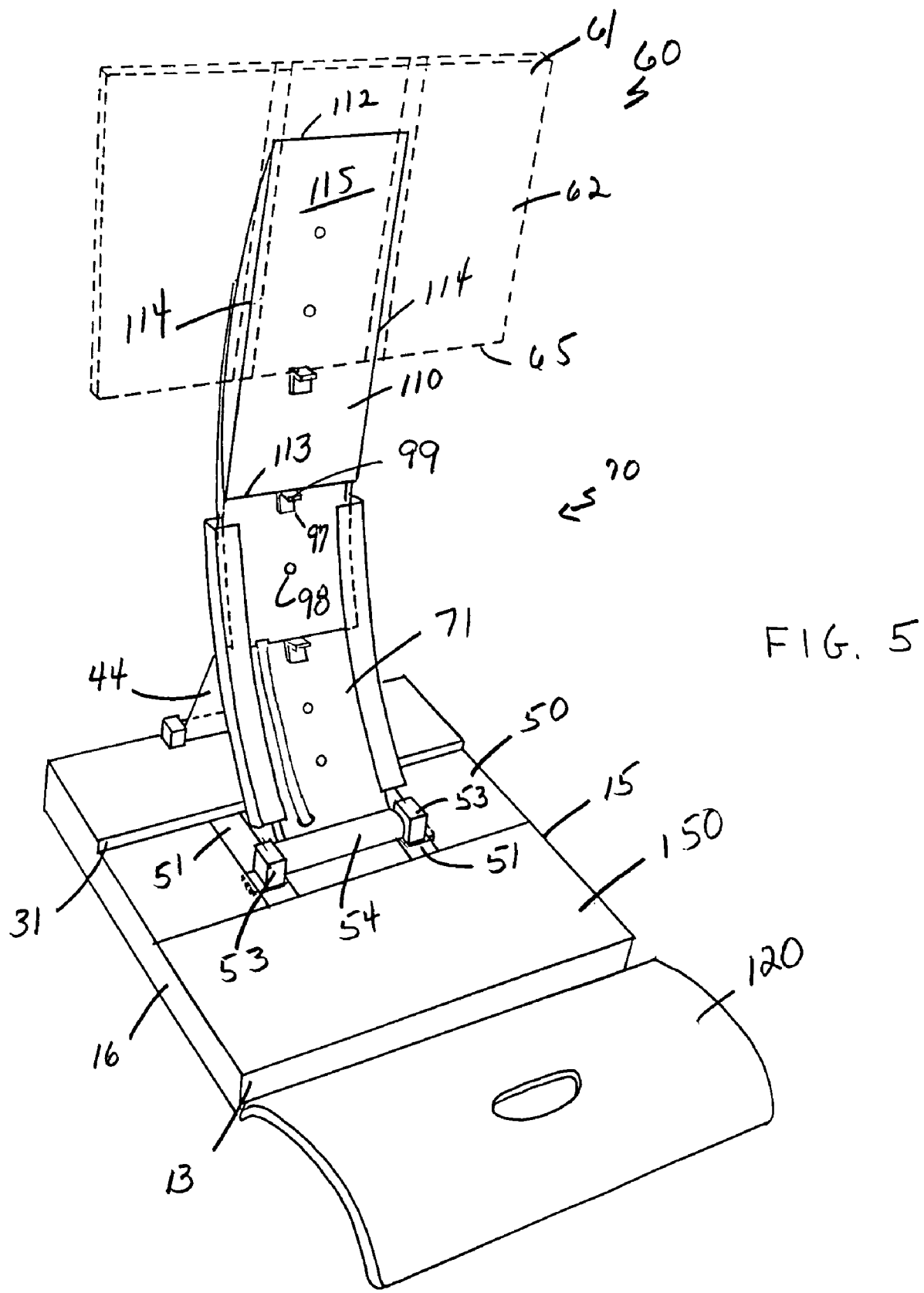
FIG. 5 is a front view of the invention with display unit fully deployed.
Figure 6:
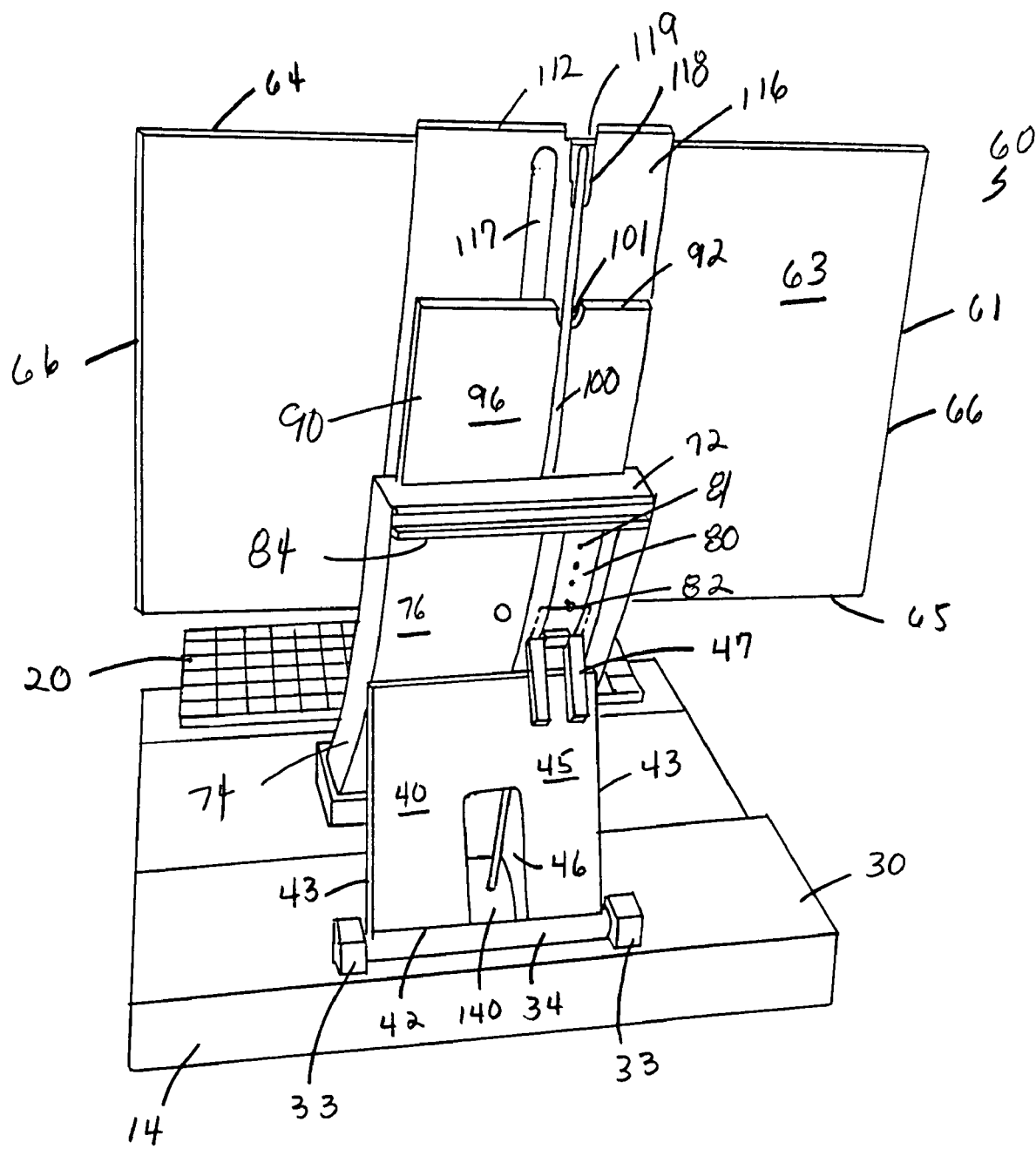
FIG. 6 is a rear view of the invention with display unit approximately 75% deployed.
Figure 7:
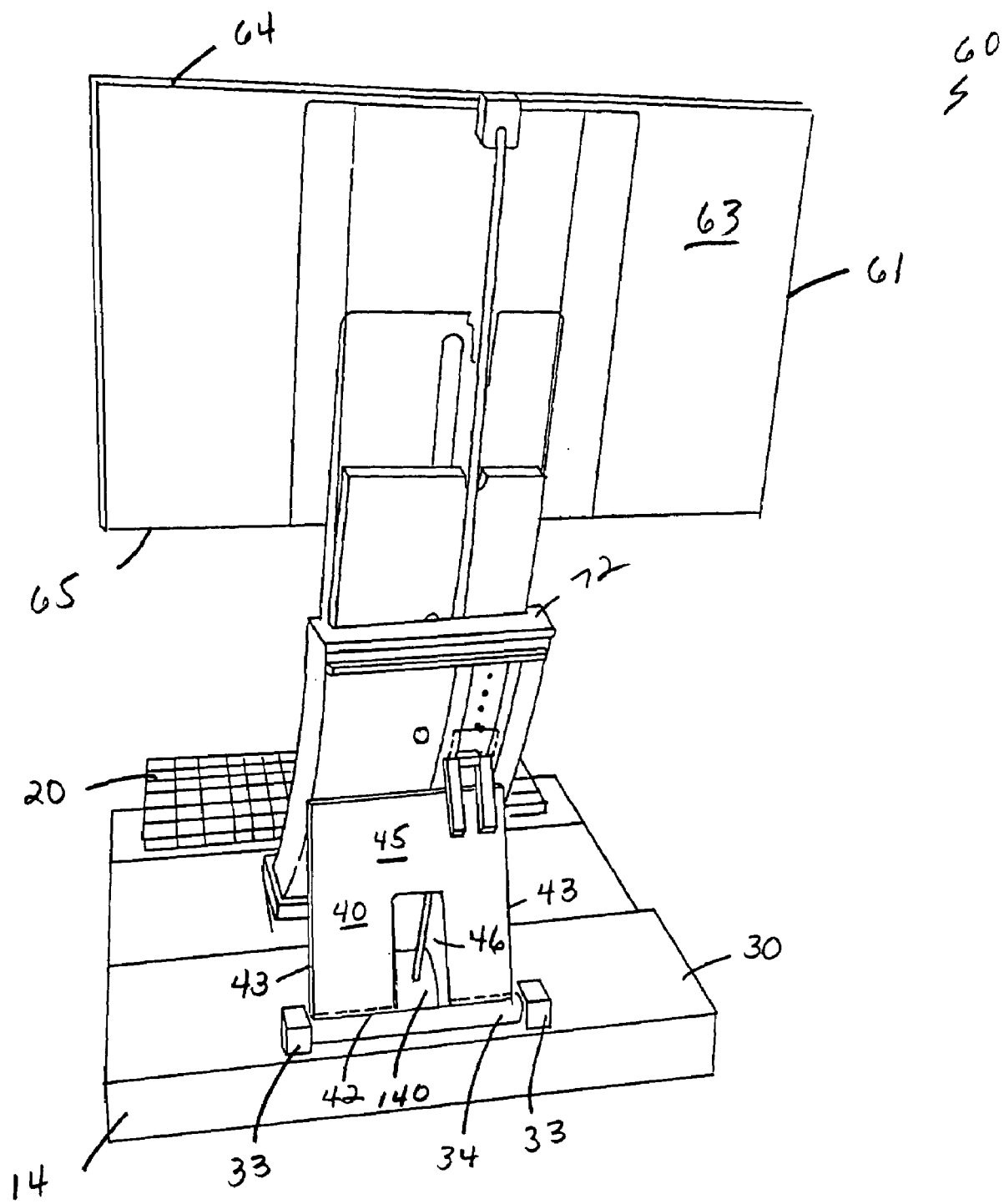
FIG. 7 is a rear view of the invention with display unit fully deployed.
Figure 8:
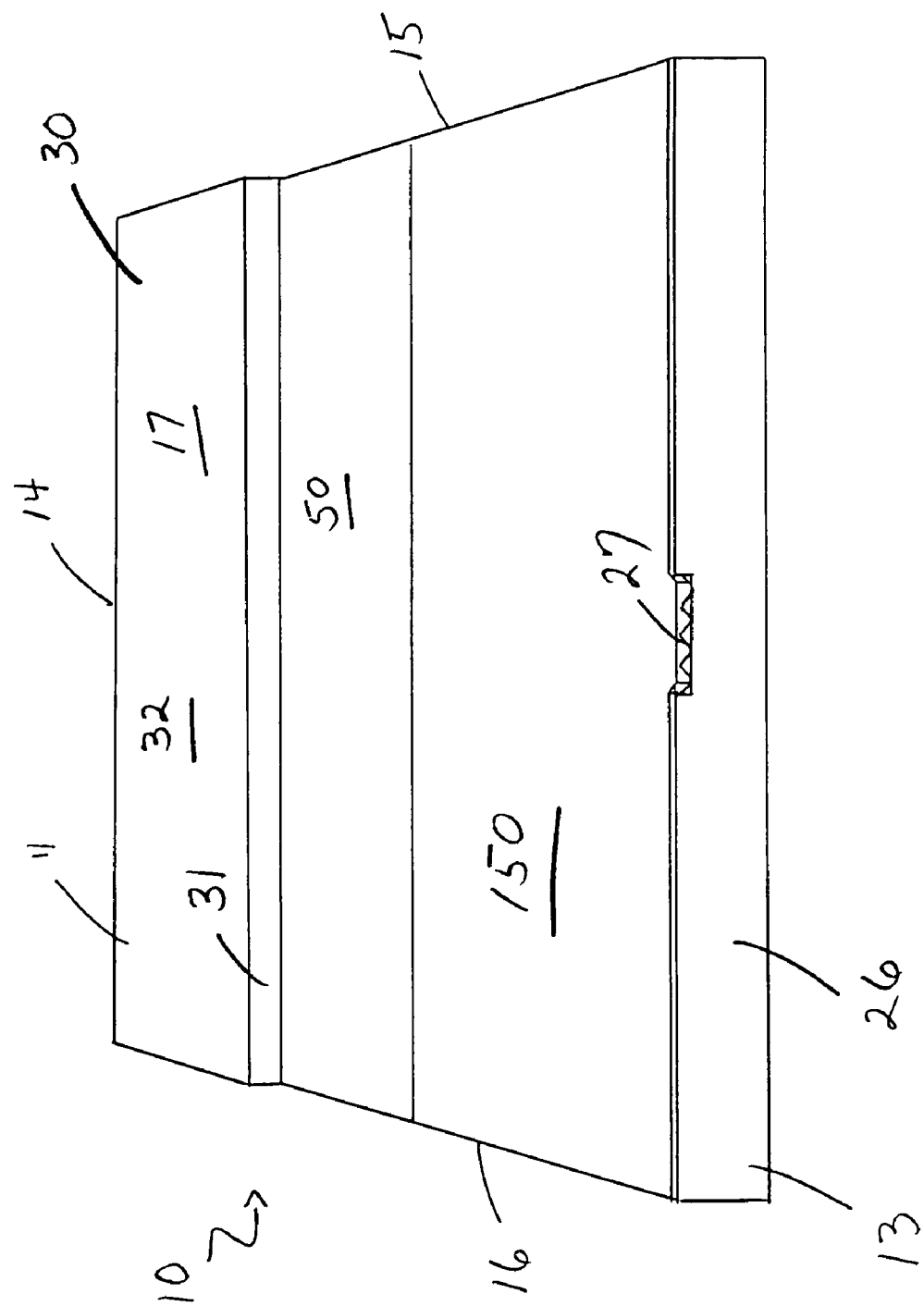
FIG. 8 is a front perspective view of the main computer body.
Figure 9:
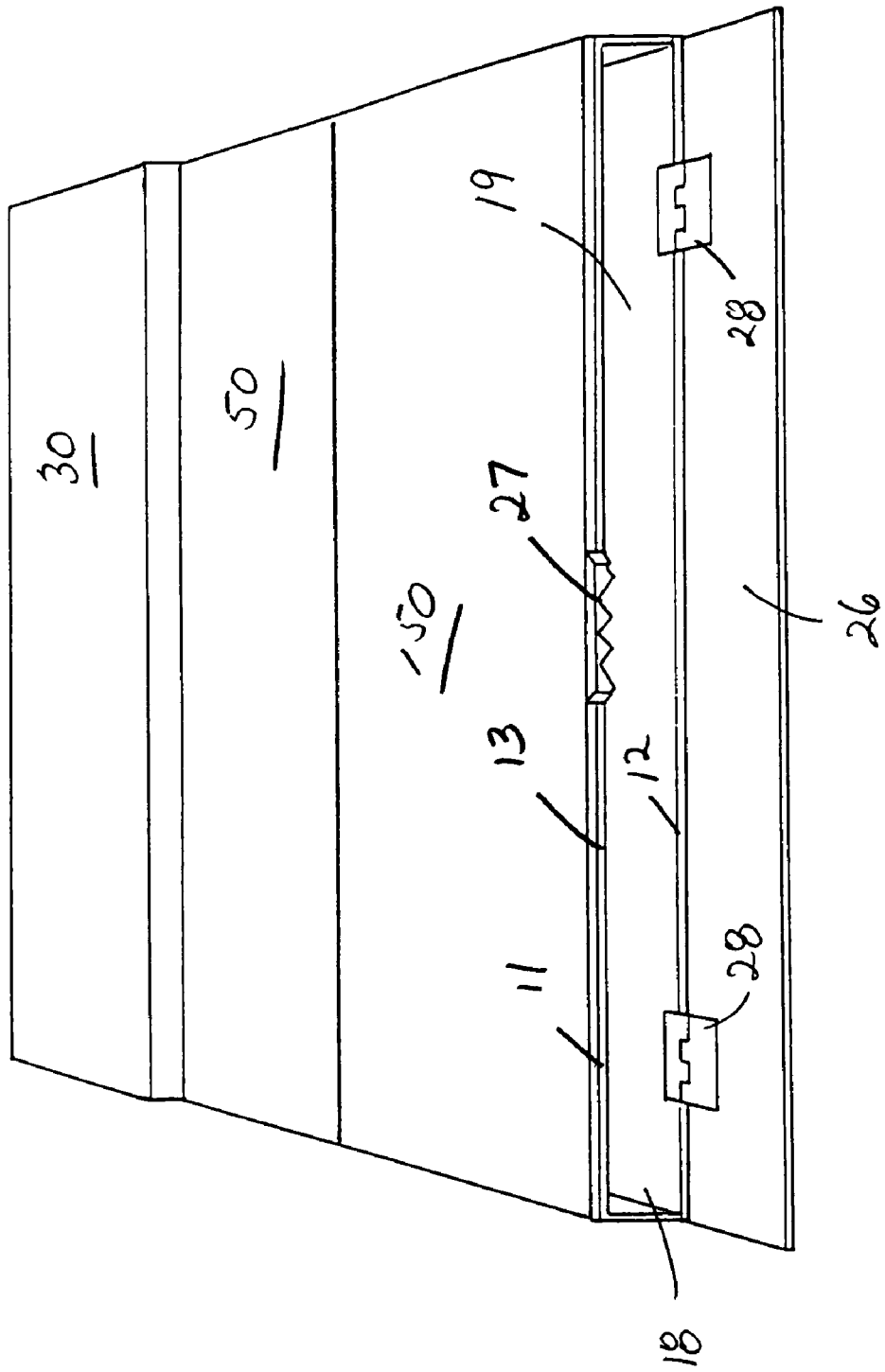
FIG. 9 is the view shown in FIG. 8 with the keyboard door open.
Figure 10:
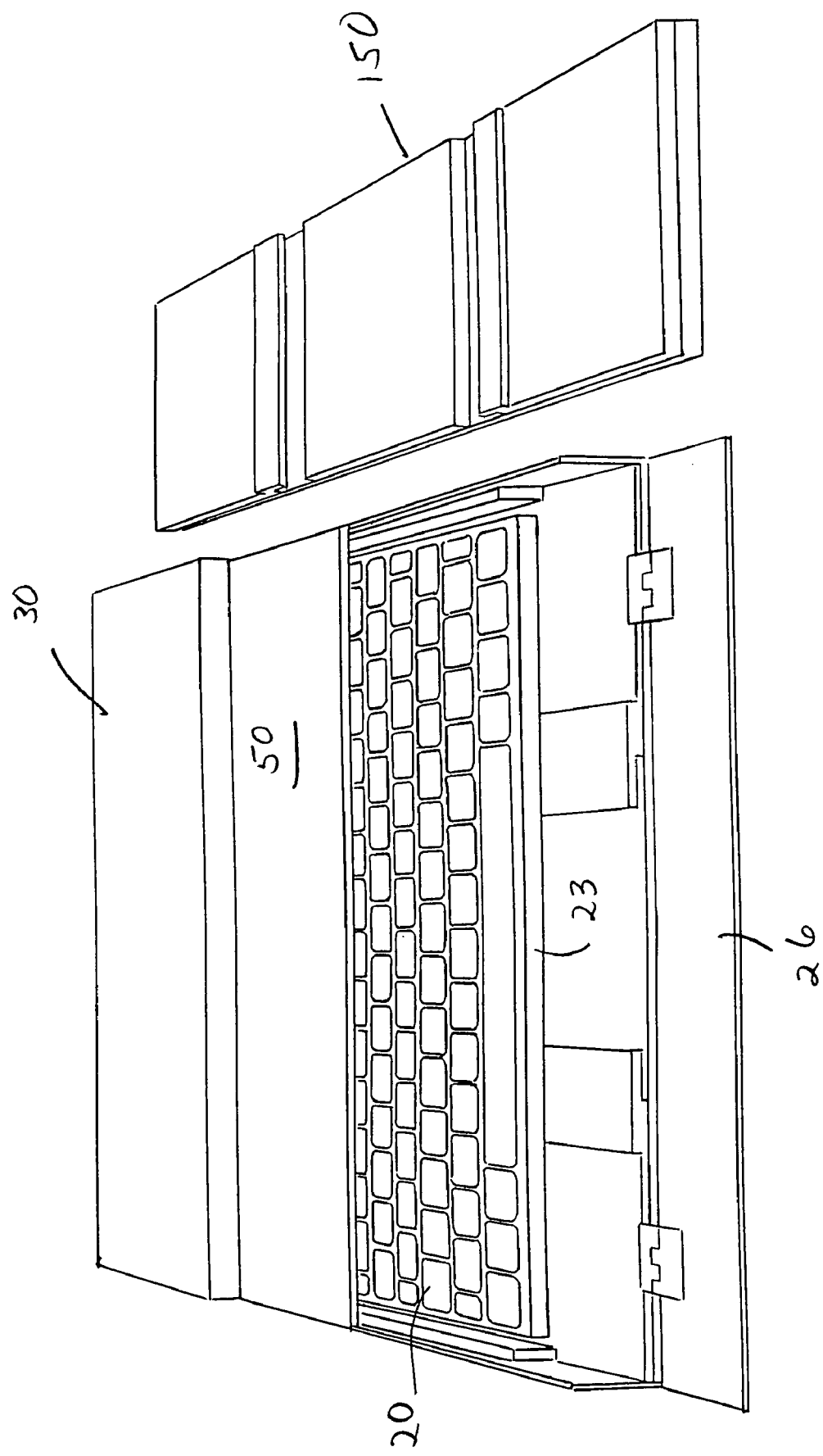
FIG. 10 is the view shown in FIG. 9 with the document holder removed.

Referring more particularly to FIGS. 2B, 6 and 7, the rear shelf portion has a top, flat surface 32 upon which is mounted a first swivel assembly 35 comprised of two posts 33 fixedly attached to the shelf top flat portion 32 and abutting the computer body rear 14. The posts 33 hold each end of a cylindrical rod 34, horizontally positioned between the posts 33, said rod 34 being parallel to the computer body rear 14. The first swivel assembly 35 is centered between the two computer body sides 15, 16.

The present invention is also comprised of a generally flat, rectangular, brace element 40 having a top 41, a bottom 42, two parallel, opposite sides 43, an inner surface 44 and an outer surface 45, said top 41 and bottom 42 defining a brace element longitudinal axis. The brace element bottom 42 is rotatably attached to the swivel rod 34. The brace element 40 has an open central aperture 46 extending from the brace element bottom 42 approximately half the brace element distance toward the brace element top 41. An inverted U-shaped element 47 is attached to the brace outer surface 45 near to the top 41 and a side 43, said element 47 protruding along the brace longitudinal axis past the top 41.

In addition to the brace element 40, a wire take-up reel 140 is embedded in the rear shelf portion 30. The brace central aperture 46 provides clearance over the reel 140. See FIGS. 2B and 6.

Referring more particularly to FIGS. 3A, 3B, 4 and 5, the middle indented portion 50 has two, parallel tracks 51 extending forwardly from the rear shelf foremost edge 31 approximately one-third the distance toward the computer body front 13. The tracks 51 are parallel to the computer body sides 15, 16 and are centrally positioned between said sides 15, 16. A second swivel assembly 55 comprised of two posts 53 is slidably attached to the tracks, one post 53 per track 51. The posts 53 hold each end of a cylindrical rod 54, horizontally positioned between the posts 53, said rod 54 being parallel to the rear shelf foremost edge 31.

The portable computer display unit 60 is comprised of a display 61 and an interface subsystem 70. The display 61, itself, is a standard, planar, generally rectangular element comprised (in this embodiment) of a liquid-crystal display (LCD). The display 61 has a front viewing surface 62, a rear 63, a top 64, a bottom 65, and two sides 66. The display 61 is attached to the main computer body by an interface subsystem 70. As may be seen most clearly in FIG. 2B, the display 61 is adapted to being folded into the main body middle indented portion 50 and onto the forward shelf and document holder 150 when not in use and prior to deployment. The interface subsystem 70 is comprised of three sections: a proximal section 71, an intermediate section 90 and a distal section 110.

The proximal section 71 has a top 72, a bottom 73, two parallel and opposite sides 74, an inner surface 75 and an opposite, parallel outer surface 76, said top 72 and bottom 73 defining a longitudinal axis of the proximal section 71. The proximal section bottom 73 is connected to the second swivel assembly 55 and rotatably joined to the second swivel assembly cylindrical rod 54. Each side 74 has a channel flange 77 formed over a perimeter portion of the proximal section inner surface 75. The proximal section inner surface 75 has a row of holding apertures 85 centrally along its longitudinal axis. The holding apertures 85 are each adapted to receive a holding pin 86. The proximal section 71 also has a wire aperture 78 formed therein near to the bottom 73, offset from the longitudinal central axis, and extending through the inner and outer surfaces 75, 76. The proximal section inner surface 75 may optionally have an elongated wire channel 83 formed along its longitudinal axis, but offset from the central elongated axis. The proximal section aperture 78 would open through said channel 83. The proximal section outer surface 76 has a channel 80 formed along its length, said channel 80 being offset from a proximal section longitudinal axis center line. The channel 80 has a row of pin apertures 81 along its longitudinal axis, said apertures 81 adapted to receive a holding pin 82. The proximal section outer surface 76 also has a crossbar 84 near to the proximal section top 72, said crossbar 84 extending to the sides 74. The proximal section 71, itself, may optionally be concavely curved about the inner surface longitudinal axis.

The intermediate section 90 has a top 92, a bottom 93, two parallel and opposite sides 94, an inner surface 95 and an opposite, parallel outer surface 96, said top 92 and bottom 93 defining a longitudinal axis of the intermediate section 90. The intermediate section 90 is adapted to lay against the proximal section so that the intermediate section outer surface 96 lies against the proximal section inner surface 75, and the intermediate section sides 94 are positioned within the proximal section channel flanges 77. As the intermediate section 90 is slid upward a holding pin 86 may be inserted into one of the proximal section holding apertures 85. The intermediate section bottom 93 would rest against said holding pin 86 thereby holding the intermediate section 90 in a desired position. The intermediate section inner surface 95 has several T-blocks 97 attached thereto along the central longitudinal axis of the intermediate section. In addition to the T-blocks 97, several holding apertures 98 are also formed in the same row as the T-blocks 97. The holding apertures 98 are adapted to receive a holding pin 99. The intermediate section outer surface 96 has a wire channel 100 formed along its length, said channel 100 being offset from an intermediate section longitudinal axis center line. The channel 100 terminates at the intermediate section top 92 in a notch 101 formed in the intermediate section top 92. The intermediate section 90 may also optionally be concavely curved about the intermediate section inner surface longitudinal axis.

The distal section 110 has a top 112, a bottom 113, two parallel and opposite sides 114, an inner surface 115 and an opposite, parallel outer surface 116, said top 112 and bottom 113 defining a longitudinal axis of the distal section 110. The distal section 110 has an open, elongated channel 117 formed therein, said channel 117 opening onto the inner and outer surfaces 115, 116, said channel 117 being formed along the central longitudinal axis of the distal section 110. The distal section 110 is adapted to lay against the intermediate section 90 so that the distal section outer surface 116 lies against the intermediate section inner surface 95. The intermediate section T-blocks 97 engage the distal section elongated channel 117. As the distal section 110 is slid upward a holding pin 99 may be inserted into one of the intermediate section holding apertures 98. The distal section bottom 113 would rest against said holding pin 99 thereby holding the distal section 110 in a desired position. The distal section outer surface 116 has a wire channel 118 formed along its length, said channel 118 being offset from an distal section longitudinal axis center line. The channel 118 terminates at the distal section top 112 in a notch 119 formed in the distal section top 112. The distal section 110 may also optionally be concavely curved about distal section inner surface longitudinal axis.

The display rear 63 is attached to the distal section 110. The display 61 thereby is manipulated as the distal section 110 is manipulated. When the display unit 60 is raised from its closed position as shown in FIG. 2B, the brace element 40 is also raised to engage the proximal section outer surface 76. The brace element U-shaped element 47 engages the proximal section, outer surface, channel holding pin 82. The engagement of the proximal section 71 by the brace element 40 determines the depth position of the display. The proximal section crossbar 84 sets a maximum height for brace element 40 engagement of the proximal section 71, and thereby the depth of the display 61. The display 61 may then be raised to a desired height by manipulation of the intermediate and distal sections 90, 110.

The invention computer 5 may be held in a closed position by a removable wrist rest 120. The wrist rest is an elongated curved element having an interior surface 121, an exterior surface 122 and two ends 123. The element 120 has a concave shape about its interior surface which is snugly fitted over the main body front 13 grasping the top 11 and bottom 12 when not in use. When removed from the computer 5, the element 120 is laid down so that the interior surface opening 121 is facing downward on the work surface and the exterior surface 122 is facing upward. The use may rest his or her wrists on the element 120 while manipulating the keyboard unit 20.

As stated above the forward shelf/document holder 150 is removable from the main computer body 10 where it acts as the forward portion of the main computer body top 11. The document holder 150 has a generally rectangular shape with a front surface 151, a rear surface 152, a top 153, a bottom 154, and two opposite sides 155. The document holder rear surface 152 has two elongated, parallel channels 156 formed therein, said channels 156 extending from top 153 to bottom 154, said channels 156 being perpendicular to the sides 155. Two elongated extender elements 160, each having two opposite ends, one end being an insert end 161 and the other end 162 terminating in a ninety degree flange 163, are each inserted into one of the channels 156, insert end 161 first. The document holder bottom 154 would rest against a holding pin 86 thereby holding the document holder 150 in a desired position. A document (not shown) may be placed against the document holder front surface 151, resting on the extender element flanges 163.

It is understood that the above-described embodiment is merely illustrative of the application. Other embodiments may be readily devised by those skilled in the art which will embody the principles of the invention and fall within the spirit and scope thereof.

I claim:

1. An ergonomic portable computer, comprising:
    a main computer body having a top, bottom, front, rear, right side, left side, an exterior surface, said top, bottom, front, rear, right side and left side defining a main computer body interior, said main computer body interior containing conventional computer electronics such as central processor unit, memory, hard drive, driver electronics, bus, diskette and CD-ROM drives, said main computer body front and rear defining a main computer body length, said computer body right side and left side defining a main computer body width, said main computer body top having a stepped configuration divided into a rear shelf portion extending from left side to right side, a middle indented portion extending from left side to right side, and a removable combination forward shelf and document holder portion, said middle indented portion beginning at a rear shelf portion foremost edge and extending toward the computer body front and terminating at the combination forward shelf and document holder portion, said middle indented portion having two, parallel tracks extending forwardly from the rear shelf foremost edge toward the computer body front, said parallel tracks being centrally positioned and parallel to the main computer body left and right sides;
    a first swivel assembly mounted on a rear shelf portion top, flat surface;
    a brace element rotatably attached to the first swivel assembly;
    a second swivel assembly slidably attached to said middle indented portion parallel tracks;
    a keyboard unit electrically and mechanically connected to said main computer body, said keyboard unit being positioned to the main computer body front;
    a planar, generally rectangular display unit attached to said main computer body by means of an interface subsystem, said display unit being positioned on said main computer body top and adapted to being extended to said main computer body rear, said display unit having a front viewing surface, a rear, a top, a bottom, and two sides, said display unit adapted to being folded into the main computer body middle indented portion and onto a forward shelf and document holder front surface; and
    a cover removably positioned over the main computer body top and sides.

2. An ergonomic portable computer as recited in claim 1, wherein the interface subsystem is comprised of:
    a proximal section having a top, a bottom, two parallel and opposite sides, an inner surface and an opposite, parallel outer surface, said proximal section top and proximal section bottom defining a longitudinal axis of the proximal section, said proximal section bottom being rotatable connected to the second swivel assembly, each proximal section side having a channel flange formed over a perimeter portion of the proximal section inner surface, said proximal section inner surface having a row of holding apertures centrally positioned along its longitudinal axis, each said holding aperture adapted to receive a holding pin;
    an intermediate section having a top, a bottom, two parallel and opposite sides, an inner surface and an opposite, parallel outer surface, said top and bottom defining an intermediate section longitudinal axis, said intermediate section being adapted to lay against the proximal section so that the intermediate section outer surface lies against the proximal section inner surface, and the intermediate section sides are positioned within the proximal section channel flanges; and a distal section having a top, a bottom, two parallel and opposite sides, an inner surface and an opposite, parallel outer surface, said top and bottom defining a distal section longitudinal axis, said distal section adapted to lay against the intermediate section so that the distal section outer surface lies against the intermediate section inner surface;

wherein the display unit rear is attached to the distal section.

3. An ergonomic portable computer as recited in claim 2, wherein:

the brace element is a generally flat, rectangular, element having a top, a bottom, two parallel, opposite sides, an inner surface and an outer surface, said top and bottom defining a brace element longitudinal axis, rod, said brace element having an inverted U-shaped element attached to the brace outer surface near to the brace element top and a brace element side, said element U-shaped element protruding along the brace longitudinal axis past the brace element top.

4. An ergonomic portable computer as recited in claim 3, wherein:

the removable combination forward shelf and document holder portion has a generally rectangular shape with a front surface, a rear surface, a top, a bottom, and two opposite sides, said removable combination forward shelf and document holder bottom adapted to rest on said proximal section inner surface holding pin.

5. An ergonomic portable computer as recited in claim 4, wherein said proximal section is further comprised of:

a wire aperture formed therein near to the proximal section bottom, offset from the proximal section longitudinal central axis, and extending through the proximal section inner and outer surfaces;

a channel formed along said proximal section outer surface, said channel being offset from a proximal section longitudinal axis center line, said proximal section outer surface channel having a row of pin apertures along its longitudinal axis, each said aperture adapted to receive a holding pin;

a crossbar on said proximal section outer surface having near to the proximal section top, said crossbar extending to the proximal section opposite sides;

an elongated wire channel formed in said proximal section inner surface along said proximal section longitudinal axis, offset from the central elongated axis.

6. An ergonomic portable computer as recited in claim 5, wherein said intermediate section is further comprised of:

a plurality of T-blocks attached thereto along a central longitudinal axis of the intermediate section inner surface;

a plurality of holding apertures formed along the central axis of the intermediate section inner surface, each said holding apertures adapted to receive a holding pin;

a wire channel formed in the intermediate section outer surface along its length, said wire channel being offset from an intermediate section longitudinal axis center line, said wire channel terminating at the intermediate section top in a notch formed in the intermediate section top;

wherein said intermediate section bottom is adapted to rest on a proximal section holding pin.

7. An ergonomic portable computer as recited in claim 6, wherein said intermediate section is further comprised of:

an open, elongated channel formed therein, said elongated channel opening onto the distal section inner and outer surfaces, said elongated channel being formed along a distal section central longitudinal axis;

wherein said intermediate section T-blocks are adapted to engage the distal section elongated channel;

a wire channel formed in the distal section outer surface along its length, said wire channel being offset from a distal section longitudinal axis center line, said wire channel terminating at the distal section top in a notch formed in the distal section top;

wherein said distal section bottom is adapted to rest on an intermediate section holding pin.

8. An ergonomic portable computer as recited in claim 7, further comprising:

a wire take-up reel embedded in the rear shelf portion.

9. An ergonomic portable computer as recited in claim 8, wherein:

the brace element has an open central aperture extending from the brace element bottom toward the brace element top, said brace central aperture adapted to provide clearance over the said wire take-up reel.

10. An ergonomic portable computer as recited in claim 9, wherein:

said main computer body front has a generally rectangular aperture formed therein and opening into the computer body interior, said rectangular aperture being secured by a door;

wherein the keyboard unit is adapted to being inserted into said rectangular aperture.

11. An ergonomic portable computer as recited in claim 10, further comprising:

an elongated removable curved wrist rest having an interior surface, an exterior surface and two ends, said wrist rest having a concave shape about its interior surface which is snugly fitted over the main computer body front grasping the main computer body top and bottom.

12. An ergonomic portable computer as recited in claim 11, wherein said removable combination forward shelf and document holder is further comprised of:

two elongated, parallel channels formed in rear surface, said channels extending from top to bottom and being perpendicular to the sides;

two elongated extender elements, each extender element having two opposite ends, one end being an insert end and the other end terminating in a ninety degree flange, each said extender element adapted to be inserted into one of said channels, insert end first, said extender elements extending from the bottom of said removable combination forward shelf and document holder.

13. An ergonomic portable computer as recited in claim 12, wherein:

said first swivel assembly is comprised of two posts fixedly attached to the shelf top flat portion and abutting the main computer body rear, said posts hold each end of a cylindrical rod, horizontally positioned between the posts, said rod being parallel to the computer body rear, said first swivel assembly being centered between the two computer body sides;

wherein said brace element bottom is rotatably attached to the first swivel assembly cylindrical rod;

said second swivel assembly is comprised of two posts slidably attached to the middle indented portion having parallel tracks, said posts holding each end of a cylindrical rod, horizontally positioned between the posts, said rod being parallel to the rear shelf foremost edge;
wherein said proximal section bottom is rotatably joined to the second swivel assembly cylindrical rod.

14. An ergonomic portable computer as recited in claim 13, wherein:
the brace element U-shaped element is adapted to engage the proximal section, outer surface, channel holding pin.

* * * * *